United States Patent
Rehn

(10) Patent No.: US 10,132,471 B2
(45) Date of Patent: Nov. 20, 2018

(54) LIGHTING DEVICE HAVING LIGHT SOURCE AND REFLECTOR HAVING ELLIPSOIDAL REFLECTION SURFACE

(71) Applicant: OSRAM GmbH, Munich (DE)

(72) Inventor: Henning Rehn, Berlin (DE)

(73) Assignee: OSRAM GmbH, Munich (DE)

( * ) Notice: Subject to any disclaimer, the term of this patent is extended or adjusted under 35 U.S.C. 154(b) by 138 days.

(21) Appl. No.: 15/006,142

(22) Filed: Jan. 26, 2016

(65) Prior Publication Data

US 2016/0215959 A1     Jul. 28, 2016

(30) Foreign Application Priority Data

Jan. 26, 2015  (DE) .......................... 10 2015 201 300

(51) Int. Cl.
*F21V 13/04* (2006.01)
*F21V 5/04* (2006.01)
(Continued)

(52) U.S. Cl.
CPC ................ *F21V 13/04* (2013.01); *F21V 5/04* (2013.01); *F21V 5/048* (2013.01); *F21V 7/0033* (2013.01);
(Continued)

(58) Field of Classification Search
CPC . F21V 13/04; F21V 5/04; F21V 5/048; F21V 7/0033; F21V 7/045; F21V 7/08;
(Continued)

(56) References Cited

U.S. PATENT DOCUMENTS 5,309,340 A * 5/1994 Shigeta .................. F21V 13/12
                                                    362/299
5,438,379 A    8/1995 Kurematsu
(Continued)

FOREIGN PATENT DOCUMENTS

DE           69319078 T2    12/1998
DE         102005044237 A1    3/2007
(Continued)

OTHER PUBLICATIONS

German Search Report based on Application No. 10 2015 201 300.6 (8 Pages) dated Sep. 3, 2015 (Reference Purpose Only).
(Continued)

*Primary Examiner* — Y M. Lee
(74) *Attorney, Agent, or Firm* — Viering Jentschura & Partner mbB

(57) ABSTRACT

A lighting device includes a light source, a reflector having an ellipsoidal reflection surface, an aspherical lens, and an exit pupil. The source is arranged at a first focal point of the reflection surface and a part of the emitted light is reflected from the reflection surface in the direction of a second focal point. The pupil is arranged offset with respect to the second focal point. The lens is arranged between the reflection surface and the pupil in a beam path with the reflected light and is shaped such that a first part of the reflected light passes through the lens with an aperture angle altered by not more than 5° in a central region and passes through the pupil and a second part of the reflected light penetrates through the lens in an outer region and is deflected by the lens and is consequently guided through the pupil.

14 Claims, 5 Drawing Sheets

(51) Int. Cl.

| | |
|---|---|
| *F21V 7/08* | (2006.01) |
| *F21V 11/10* | (2006.01) |
| *G02B 19/00* | (2006.01) |
| *F21V 7/00* | (2006.01) |
| *F21V 7/04* | (2006.01) |
| *F21W 131/406* | (2006.01) |
| *F21Y 101/00* | (2016.01) |
| *F21Y 115/10* | (2016.01) |

(52) U.S. Cl.
CPC ............... *F21V 7/045* (2013.01); *F21V 7/08* (2013.01); *F21V 11/10* (2013.01); *G02B 19/0028* (2013.01); *F21W 2131/406* (2013.01); *F21Y 2101/00* (2013.01); *F21Y 2115/10* (2016.08)

(58) Field of Classification Search
CPC ............... F21V 11/10; G02B 19/0028; F21W 2131/406; F21Y 2101/00
See application file for complete search history.

(56) References Cited

U.S. PATENT DOCUMENTS

| | | | |
|---|---|---|---|
| 6,231,193 B1* | 5/2001 | Sugawara | G02B 19/0028 362/335 |
| 6,386,743 B1 | 5/2002 | Futami et al. | |
| 2002/0048172 A1 | 4/2002 | Wada et al. | |
| 2002/0048173 A1* | 4/2002 | Schmucker | B60Q 1/2611 362/487 |
| 2002/0159262 A1 | 10/2002 | Romano et al. | |

FOREIGN PATENT DOCUMENTS

| | | |
|---|---|---|
| DE | 69938445 T2 | 4/2009 |
| EP | 0395156 A1 | 10/1990 |
| GB | 934650 A | 8/1963 |

OTHER PUBLICATIONS

European Search Report based on Application No. 15201889.1(7 Pages) dated Apr. 1, 2016 (Reference Purpose Only).

\* cited by examiner

|   | E | A |
|---|---|---|
| c | $4{,}84 \cdot 10^{-3}$ | $-3{,}84 \cdot 10^{-3}$ |
| k | $-2{,}84 \cdot 10^{-1}$ | $3{,}81 \cdot 10^{-1}$ |
| $\beta_1$ | $-5{,}68 \cdot 10^{-3}$ | $7{,}68 \cdot 10^{-4}$ |
| $\beta_2$ | $-3{,}21 \cdot 10^{-3}$ | $4{,}59 \cdot 10^{-4}$ |
| $\beta_3$ | $-8{,}41 \cdot 10^{-5}$ | $6{,}33 \cdot 10^{-5}$ |
| $\beta_4$ | $2{,}30 \cdot 10^{-5}$ | $-1{,}94 \cdot 10^{-5}$ |
| $\beta_5 \ldots$ | 0 | 0 |

Fig. 6

LIGHTING DEVICE HAVING LIGHT SOURCE AND REFLECTOR HAVING ELLIPSOIDAL REFLECTION SURFACE

CROSS-REFERENCE TO RELATED APPLICATION

This application claims priority to German Patent Application Serial No. 10 2015 201 300.6, which was filed Jan. 26, 2015, and is incorporated herein by reference in its entirety.

TECHNICAL FIELD

Various embodiments relate generally to a lighting device having a light source for emitting light and a reflector having an ellipsoidal reflection surface.

BACKGROUND

The use of ellipsoidal reflection surfaces for concentrating the light emitted by an approximately point light source is known. If the light source is arranged at the first focal point of the ellipsoidal reflection surface, the light is concentrated at the second focal point by the reflection at said ellipsoidal reflection surface. The two focal points lie on an optical axis of the ellipsoidal reflection surface. In the case of the lighting devices including a corresponding reflector as known from the prior art, an exit pupil is then arranged in the second focal plane. However, the illuminance distribution there is generally inhomogeneous with a central maximum (spot) and a distinct fall-off toward the edge.

SUMMARY

A lighting device includes a light source, a reflector having an ellipsoidal reflection surface, an aspherical lens, and an exit pupil. The source is arranged at a first focal point of the reflection surface and a part of the emitted light is reflected from the reflection surface in the direction of a second focal point. The pupil is arranged offset with respect to the second focal point. The lens is arranged between the reflection surface and the pupil in a beam path with the reflected light and is shaped such that a first part of the reflected light passes through the lens with an aperture angle altered by not more than 5° in a central region and passes through the pupil and a second part of the reflected light penetrates through the lens in an outer region and is deflected by the lens and is consequently guided through the pupil.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 6 shows a table with the parameters of the aspherical lens shown in FIG. 1 and FIG. 3.

DESCRIPTION

Figure 1:
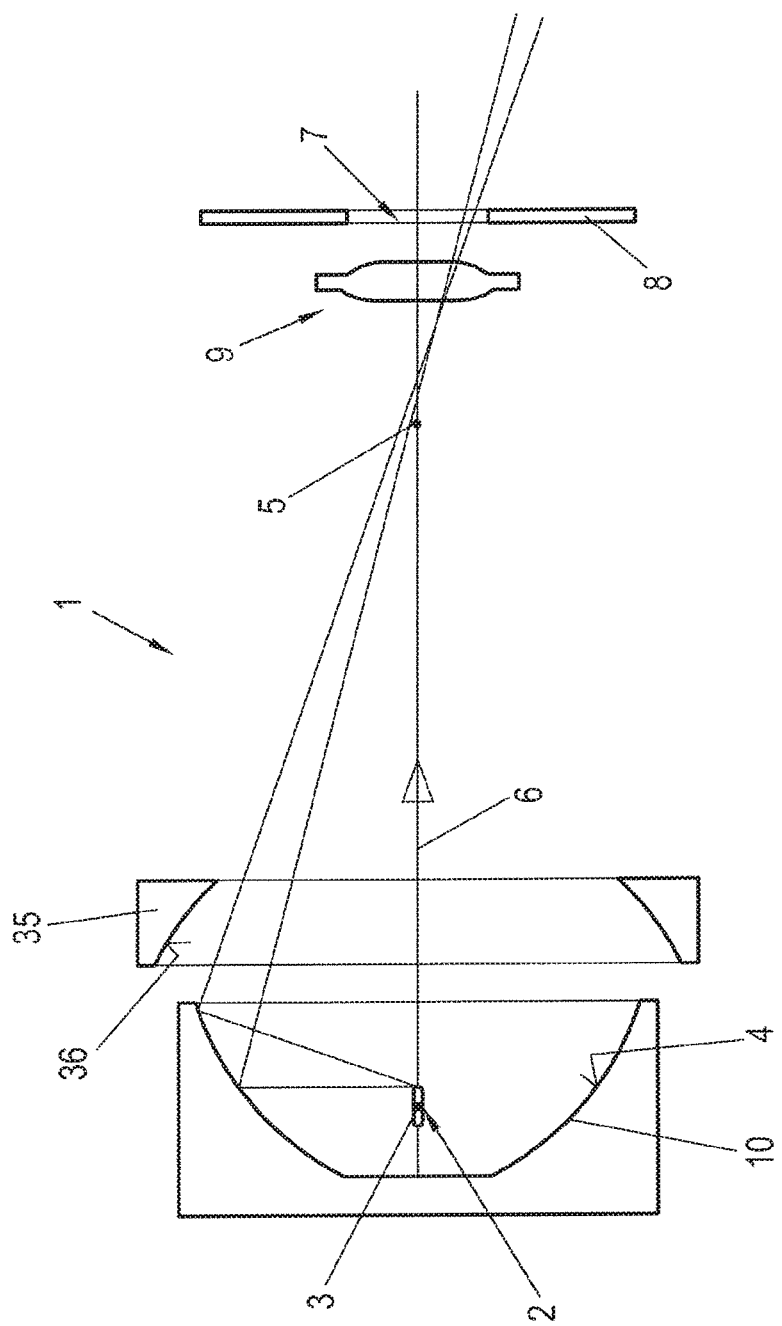
FIG. 1 shows a lighting device according to various embodiments in a schematic section with a beam path illustrating the first part of the reflected light.

The following detailed description refers to the accompanying drawings that show, by way of illustration, specific details and embodiments in which the invention may be practiced.

Various embodiments are explained in greater detail below, wherein the individual features in the context of the independent claims may also be essential to various embodiments in a different combination and are intended to be disclosed in this form; furthermore, no distinction is drawn in specific detail between the different claim categories.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

For the purpose of homogenization, the prior art proposes a faceting of the ellipsoidal reflection surface; however, the inventor has established that although this can improve the homogeneity, it leads, on the other hand, to a reduction of efficiency. Only a part of the light emitted by the light source can usually be utilized.

Various embodiments specify a particularly advantageous lighting device.

According to various embodiments, a lighting device is provided including a light source for emitting light, a reflector having an ellipsoidal reflection surface, an aspherical lens and an exit pupil as output of the lighting device, wherein the light source is arranged at a first focal point of the ellipsoidal reflection surface and at least one part of the light emitted by the light source is reflected from the ellipsoidal reflection surface in the direction of a second focal point, and wherein the exit pupil is arranged in a manner offset with respect to the second focal point, and wherein further the aspherical lens is arranged between the ellipsoidal reflection surface and the exit pupil in a beam path with the reflected light and is shaped in such a way that a first part of the reflected light passes through the aspherical lens with an aperture angle altered by not more than 5° in a central region and passes through the exit pupil and additionally a second part of the reflected light penetrates through the aspherical lens in an outer region and is deflected by the aspherical lens and is consequently guided through the exit pupil.

Various embodiments are evident from the dependent claims and the present disclosure in its entirety. In this case, in the summary a distinction is not always drawn in specific detail between device and use aspects; the disclosure should at any rate be read implicitly with regard to all claim categories.

If a beam path of the reflected light without the aspherical lens and with a point source at the first focal point is imagined for illustration purposes, the exit pupil is dimensioned and positioned in this beam path which is not deflected (by an aspherical lens) in such a way that only the first part of the light passes through. The other, second part of the non-deflected light would not leave the lighting device through the exit pupil. The non-deflected beam path can have the shape of a right cone, for example, downstream of the second focal point, in which case only a (likewise conical) inner part with a smaller aperture angle passes through the exit pupil, whereas the surrounding outer part does not.

The aspherical lens, then, allows the first part of the light, which first part would pass through the exit pupil anyway, that is to say even without the aspherical lens, also still to emerge through the exit pupil. An aperture angle of the beam with the entire first part of the light, directly downstream of the aspherical lens, is intended to change by not more than 5°, with increasing preference in this order not more than 4°, 3°, 2°, or 1°, specifically in comparison with directly upstream of the aspherical lens. In various embodiments, the first part penetrates through the aspherical lens in a manner free of aperture angle change, that is to say without a change in its aperture angle. These indications should also be interpreted as a definition of the "first part" of the reflected light.

The first part of the light "passes" through the aspherical lens and in this case generally need not penetrate through the lens itself, that is to say the lens material, but rather can for example also pass through a hole in the lens. The central region of the aspherical lens could therefore be embodied as a hole in the aspherical lens, that is to say that the aspherical lens could as it were be a ring lens or be provided in a toroidal fashion. In the outer region, by contrast, the light (the second part) always penetrates through the lens, that is to say the lens material.

The corresponding "second part" of the light, which second part would not pass through the exit pupil in the case of the non-deflected beam path without the aspherical lens, is deflected by the aspherical lens and thus indeed through the exit pupil. Firstly, this increases the efficiency, that is to say makes more of the light emitted by the light source usable. Secondly, a more uniform illuminance distribution can thus also be achieved in the plane of the exit pupil, for instance in relation to a comparison case with an exit pupil through which the entire non-deflected beam path would already emerge (that is to say through which the second set of straight lines would also penetrate without an aspherical lens and when positioned at the second focal point).

The inventor has established that even an ideally ellipsoidal reflection surface can have the property that light emitted in a manner slightly offset with respect to the first focal point, for example, is concentrated by outer reflector regions (larger angle with respect to the optical axis of the reflector) in a small area surrounding the second focal point (spot), while the light is distributed further there by inner reflector regions (smaller angle with respect to the optical axis). However, this is only one possible reason for a certain illuminance distribution around the second focal point; a deviation from an ideally ellipsoidal shape can also play a part, for example. By virtue of the exit pupil being arranged and dimensioned according to various embodiments, the spot is distributed onto the exit pupil, but a part (the second part) of the light would lie outside the exit pupil.

The aspherical lens reduces losses by collecting the light which would lie outside the exit pupil, and may also bring the light into the edge regions of the exit pupil which were previously darker.

In various embodiments, the exit pupil is dimensioned and arranged relatively to the reflector (and in a manner offset with respect to the second focal point) such that of all straight lines which in each case penetrate through the ellipsoidal reflection surface and the second focal point, only a first set falls through the exit pupil, but a second set lies outside the exit pupil.

As a result of the arrangement of the exit pupil in such a way that only the first, but not the second, set of straight lines penetrates through the exit pupil, initially only a segment of the illuminance distribution is acquired. From a Gaussian distribution, for example, only a region around the maximum thereof (see below in detail) is separated, which reduces the difference between maximum value and minimum value. This alone would be disadvantageous with regard to efficiency, however, which is why the second part of the light is additionally directed through the exit pupil by means of the aspherical lens.

The second part of the light can generally be distributed for example uniformly over the exit pupil, which leaves unchanged a fluctuation between minimum and maximum that is predefined by the first part. On the other hand, the second part can for example also be directed with precedence onto an edge region of the exit pupil, which further reduces the fluctuation, e.g. the ratio of the illuminances of center-to-outer edge (center to edge).

The light source may be a gas discharge lamp, and a metal halide lamp may be provided; both direct-current operation (DC) and alternating-current operation (AC) are possible in this case. By way of example, short- and medium-arc discharge lamps from OSRAM can be involved, such as, for example, an HMI, HTI, HSR or SIRIUS discharge lamp. However, a xenon short-arc lamp can also be provided as the light source, for instance a lamp of the XBO type from OSRAM. On the other hand, a plasma light source is also conceivable or the light source could also be a phosphor element which is excited by a pump radiation source e.g. arranged at a distance therefrom (Laser Activated Remote Phospor, LARP), for instance an LARP sphere. In this case, the discharge lamps can be incorporated axially into the ellipsoidal reflector, such that the arc of the discharge lamp is located on the optical reflector axis. Alternatively, the abovementioned discharge lamps, especially those having a short electrode spacing, can also be incorporated transversely with respect to the optical axis of the ellipsoidal reflector. The arc is then aligned transversely with respect to the optical reflector axis.

The light source arranged at the first focal point of the ellipsoidal reflection surface may be arranged exactly at the first focal point (the latter is therefore included by an extended light source, for instance). This may relate to the light-emitting region of the light source, that is to say for instance the arc or plasma arc; depending on operation, the latter can have for example one maximum (DC) or else two maxima (AC), wherein an arc can for example also be magnetically altered, for instance compressed (magnetic arc constriction). The focal points of the ellipsoidal reflection surface are the focal points of the ellipsoid underlying the reflection surface.

Said ellipsoid is prolate (stretched), and the longitudinal axis of the ellipsoid corresponds to the optical axis of the reflection surface; the two focal points lie on said longitudinal axis/optical axis and arise as the focal point of the ellipsoid underlying the ellipsoidal reflection surface. "Ellipsoidal reflection surface" should be understood as a technical term, that is to say does not necessarily imply an ideally ellipsoidal shape, even if such a shape may be provided. The reflection surface can for example also be faceted; it may be smooth. A nonuniform illuminance distribution just described can, for example, even in the case of an ideal ellipsoid, be caused by a non-infinitesimally small extent of the light source relative to the reflection surface, specifically in conjunction with the ellipsoidal shape (of the reflection surface).

As has already become clear, the first and second sets of straight lines represent the theoretical beam path without the aspherical lens and for light emerging from the first focal point. All of the straight lines penetrating through the ellipsoidal reflection surface and the second focal point can be assigned to one of the two sets; the two sets are disjoint. In various embodiments, a part of the first part of the reflected light then propagates along the first set of straight lines (arrangement at the first focal point) and it would penetrate through the exit pupil even without the aspherical lens. By contrast, the second part would not leave the lighting device through the exit pupil without the aspherical lens. The exit pupil is arranged in a manner offset with respect to the second focal point, that is to say not at the second focal point.

In this case, the second part of the light need not necessarily include the entire light reflected along the second set of straight lines; the second part may include for example, with increasing preference in this order, at least 30%, 50%, 70%, 80%, 90%, or 95%, of the entire light reflected along the second set of straight lines. The first part is intended to include for example, with increasing preference in this order, at least 70%, 80%, 90%, or 95%, of the entire light reflected along the first set of straight lines.

Various embodiments concern the dimensioning and arrangement of the exit pupil relative to the reflector, specifically an exemplary choice of the first set of straight lines. To that end, the illuminance distribution generated by the reflected light on an entrance surface of the aspherical lens is considered (first and second parts of the light penetrate through the aspherical lens). The inventor has established that this is Gaussian to a rough approximation, for example, that is to say has a maximum centrally at any rate, the illuminance decreasing outwardly away from said maximum (for example from the inner section outward with gradients initially increasing and then decreasing again).

In general, the maximum of the illuminance distribution lies where the optical axis of the ellipsoidal reflection surface penetrates through the aspherical lens. By definition, a center region of the entrance surface that includes said maximum is then intended to reach as far as an illuminance value which is less than the value of the maximum by at least 20%, e.g. at least 30%, e.g. at least 40%, and by at most 80%, e.g. at most 70%, e.g. at most 60%. Said illuminance value defines the edge of the center region which extends from the maximum as far as said edge (and includes the latter). The first set of straight lines then penetrates in its entirety through the center region and the second set of straight lines in its entirety penetrates through an edge region of the entrance surface that lies outside said center region.

Insofar as reference is made to the "entrance surface" in the context of this disclosure, this means the entire light-traversed part of an incidence surface of the aspherical lens; the latter can also be larger, that is to say need not be traversed in its entirety. Correspondingly, the "exit surface" of the aspherical lens is the light-traversed part of an emergence surface of the aspherical lens.

In various embodiments, the aspherical lens is shaped and arranged in such a way that the first part of the reflected light penetrates through the aspherical lens substantially without a change of direction. The "change of direction" is considered to be, for each light ray, the angle between its direction before entrance and its direction after exit. "Substantially without a change of direction" then means that all light rays of the first part of the reflected light are deflected by in each case not more than 3°, e.g. not more than 2°, e.g. not more than 1°; for example, for each light ray, the direction downstream of the aspherical lens is the same as upstream, that is to say that no change in direction at all takes place.

In various embodiments, the first part of the light penetrates through the aspherical lens (that is to say that the latter does not have a hole, see above) and the aspherical lens has a substantially constant thickness, e.g. constant thickness, in the central region, wherein the thickness is taken in each case in a direction parallel to the optical axis of the aspherical lens (from entrance surface to exit surface). The "central region" of the aspherical lens is in this respect that region thereof through which in its entirety the first part of the light penetrates. Insofar as reference is made to an "optical axis of the aspherical lens", this may be identical to the optical axis of the ellipsoidal reflection surface. Looking at the aspherical lens in a direction from the ellipsoidal reflection surface to the exit pupil, said aspherical lens may be at least rotationally symmetrical (for instance quadrilateral), and e.g. it is circularly symmetrical; the optical axis of the aspherical lens is then identical to the axis of said rotational or circular symmetry.

In general, the central region of constant thickness could for example also be shaped with a stepped form or undulatory form that is complementary at the entrance and exit surfaces. In various embodiments, however, the central region of the aspherical lens is shaped as a plane-parallel plate. In other words, the entrance surface is plane in a center region and the opposite exit surface is also plane in a center region, wherein the optical axis of the aspherical lens is in each case perpendicular to the plane surface. The center region of the entrance and exit surfaces is in each case that region of the entrance and exit surfaces through which in its entirety the first part of the reflected light penetrates.

The configuration as a plane-parallel plate in the central region can for instance also be provided insofar as the aspherical lens is thus kept geometrically simple in this region, which can simplify production. Generally, the aspherical lens may be a pressed part, e.g. a pressed part made of glass; in other words, the lens is then produced by pressing into a mold. The aspherical lens can also be hardened, for instance chemically and/or thermally, in order to improve the thermal loading capacity. In general, for example, a lens made of a plastics material would also be conceivable, for instance an injection-molded part.

In general, the aspherical lens could also be arranged upstream of the second focal point (in relation to the light propagation direction from the reflection surface to the exit pupil). The central region of the aspherical lens is then shaped as a plane-parallel plate, for example, and an outer region thereof, as a diverging lens, could widen the aperture angle of the second part of the reflected light upstream of the second focal point, such that the aperture angle downstream of the second focal point would be correspondingly reduced.

In various embodiments, however, the aspherical lens is arranged between the second focal point and the exit pupil and the aspherical lens is shaped as a converging lens in the outer region, that is to say that the aperture angle of the second part of the reflected light is reduced by the aspherical lens, for example by at least 10°, 15° or 20° (with increasing preference in the order as stated); possible upper limits may be, for example, at most 60° or 40°. Insofar as the aperture angle should be of different magnitudes in different directions perpendicular to the optical axis of the aspherical lens, an average value formed over a circumference around the optical axis is generally considered in the context of this disclosure.

The positioning of the aspherical lens downstream of the second focal point may be provided, for instance, insofar as it is thus spaced apart further from the light source and is thus exposed to thermal stress at least to a somewhat lesser extent during operation, which can help to prevent, for instance, a temperature-fluctuation-governed (switching-on/-off) misalignment of the aspherical lens on account of different coefficients of thermal expansion. In addition, the larger distance can also make it possible to arrange a filter therebetween. On the other hand, the aspherical lens is thus actually also arranged nearer to the exit pupil, that is to say that it can cover the latter as it were toward the interior of the lighting device and thus also perform a splinter protection function, that is to say prevent splinters from emerging for instance in the case where the light source ruptures.

In various embodiments, the aspherical lens is spaced apart from the exit pupil and/or from the second focal point by in each case at least ¹⁄₁₀ of the distance between exit pupil and second focal point. The distance is taken in each case on the optical axis of the aspherical lens as far as the entrance surface (for the distance from the second focal point) or as far as the exit surface (for the distance from the exit pupil).

The exit pupil is defined for example by an aperture stop or an insert for an optical mask (Graphical Optical Blackout, GOBO) or the optical mask itself and is also designated as Gate. The distance to the exit pupil is then taken to that plane which is perpendicular to the optical axis of the aspherical lens and in which (relative to the light propagation) the diameter predefined by the exit pupil is effective for the first time. The diameter of the exit pupil is also determined there.

The aspherical lens may be shaped as a converging lens in the outer region; in this case, it can therefore generally also be planoconvex or concavo-convex in the outer region, but it may be biconvex.

In various embodiments, the entrance surface of the aspherical lens is convex in an edge region. The "edge region" of the entrance surface is that region thereof through which in its entirety the entire second part of the reflected light penetrates; likewise, the edge region of the exit surface is that region of the exit surface through which in its entirety the entire second part of the reflected light penetrates.

In various embodiments, the exit surface is convex in the edge region. In various embodiments, the aspherical lens is in each case convexly curved both in the entrance surface edge region and in the exit surface edge region (that is to say that it is actually biconvex in this respect).

In various embodiments, the aspherical lens is arranged nearer to the exit pupil than to the second focal point. Reference is made to the above indications concerning the distance measurement, that is to say that the distance between second focal point and entrance surface of the aspherical lens is compared with that between exit surface of the aspherical lens and exit pupil.

The exit pupil has an exit pupil diameter, where "diameter" in the context of this disclosure generally relates to the average value of smallest and largest extents and, in various embodiments of a circular shape, is equal to the circle diameter. The edge region of the entrance surface, through which edge region in its entirety the entire second part of the reflected light penetrates, has an internal diameter and an external diameter, which diameters are determined at a perpendicular projection of the entrance surface edge region into a plane perpendicular to the optical axis of the aspherical lens.

In various embodiments, the external diameter of the entrance surface edge region is greater than the exit pupil diameter, for example by, with increasing preference in this order, at least 5%, 10% or 15%; possible upper limits can be, for example, at most 50%, 40% or 30%.

In various embodiments, the aspherical lens is provided in such a way that the center region of the entrance surface, through which center region in its entirety the entire first part of the reflected light penetrates, has a certain minimum size relative to the exit pupil. The external diameter of the center region, which is likewise determined at a perpendicular projection of the center region into a plane perpendicular to the optical axis of the aspherical lens, is intended to make up, with increasing preference in this order, at least ⅔, ⅚ of ⁹⁄₁₀ of the exit pupil diameter, and to be e.g. at least equal to the exit pupil diameter, e.g. to be greater than the latter.

In various embodiments, in addition to the reflector having the ellipsoidal reflection surface, a further reflector having a spherical reflection surface is provided. Said further reflector is arranged in such a way that the light source is arranged at, e.g. in, a midpoint of the underlying sphere and a part of the light emitted by the light source is incident on the spherical reflection surface in a manner free of reflection, that is to say without previous reflection at the ellipsoidal reflection surface. In various embodiments, sphere midpoint and first focal point coincide.

In an idealized consideration (point source at the midpoint), the spherical reflection surface reflects the light back exactly to the midpoint; in reality there may be a certain offset. Even if the light reflected back at the spherical reflection surface may be proportionally absorbed at constituents of the light source, nevertheless a certain part passes through the ellipsoidal reflection surface to be reflected from the latter in the direction of the second focal point. The efficiency can thus be increased.

The above-described arrangement of the aspherical lens between the second focal point and the exit pupil can afford particular effects in this context because enough space for arranging the further reflector is thus available. The further reflector is arranged between the ellipsoidal reflection surface and the aspherical lens (relative to the light propagation direction from the former to the exit pupil), for which purpose the positioning thereof downstream of the second focal point provides enough room.

In various embodiments, the spherical reflection surface is provided completely circumferentially around the optical axis of the ellipsoidal reflection surface, but it is interrupted in a region intersected by the optical axis. A perpendicular projection of the spherical reflection surface into a plane perpendicular to the optical axis of the ellipsoidal reflection surface produces an annular shape, for example. The light reflected at the ellipsoidal reflection surface passes through the interruption region, that is to say that said light passes through the interruption region to the aspherical lens.

In the case of the ellipse underlying the ellipsoidal reflection surface, the numeral eccentricity (ratio of the distance between the focal points and the midpoint to the large semiaxis) may be not greater than 0.9, e.g. not greater than 0.85, e.g. not greater than 0.8.

Various embodiments also relate to a spotlight including a lighting device described in the present case, e.g. a stage spotlight.

Furthermore, various embodiments also relate to the use of a lighting device described in the present case or of a corresponding spotlight for lighting, e.g. for stage lighting.

FIG. 1 shows a lighting device 1 according to various embodiments in a sectional view. A light source 2, illustrated here in a simplified manner as a point source, namely a metal-halide lamp, is arranged at a first focal point 3 of a reflector 10 having an ellipsoidal reflection surface 4, that is to say a reflection surface embodied as an ellipsoid of revolution. Light emitted by the light source 2 is incident on the ellipsoidal reflection surface 4 at any rate partly directly, that is to say without previous reflection, and is reflected from said ellipsoidal reflection surface in the direction of a second focal point 5.

The first focal point 3 and the second focal point 5 lie on an optical axis 6 of the ellipsoidal reflection surface. The latter is circularly symmetrical about said optical axis 6. The light source 2, in the present case the arc of an HTI 1200 W from OSRAM, has a longitudinal extent of around 5 mm parallel to the optical axis 6 of the ellipsoidal reflection surface 4, that is to say that the emission does not take place perfectly in punctiform fashion. Consequently, not all of the light rays actually intersect at the second focal point 5. A beam of rays emitted in a manner offset with respect to the first focal point 3 is illustrated schematically and in this respect in a somewhat simplified manner.

Figure 2:
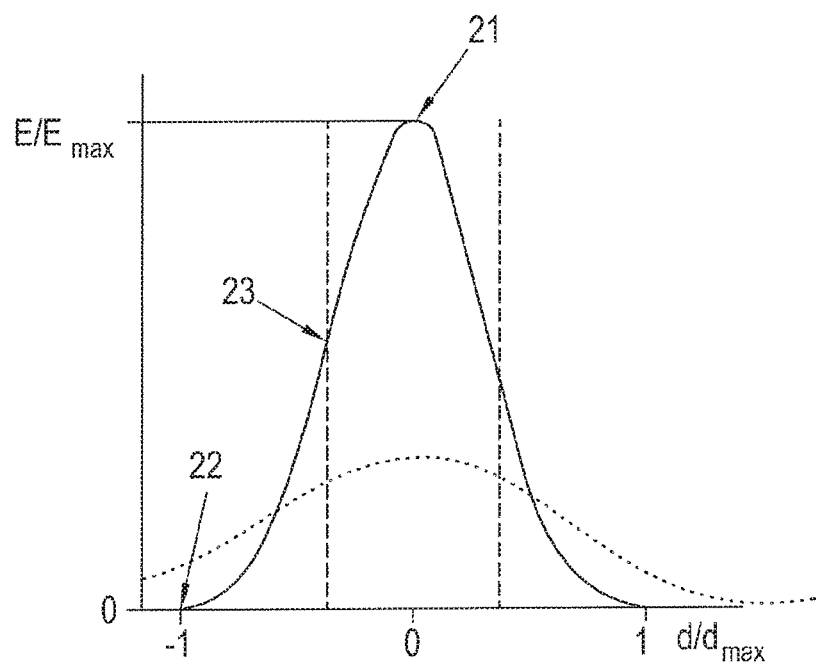
FIG. 2 shows the illuminance profile in a plane including the second focal point of the ellipsoidal reflection surface for the lighting device in accordance with FIG. 1.

FIG. 2 illustrates the illuminance profile in a plane which includes the second focal point 5 and is perpendicular to the optical axis 6 of the ellipsoidal reflection surface 4. In this case, the illuminance along a straight line—lying in said plane—through the second focal point (which is at d=0) is plotted in a diagram.

A curve which can be described approximately as Gaussian arises. From a central maximum 21, the illuminance (normalized to the maximum value in the present case) falls outwardly. The difference between an edge-side minimum 22 and the maximum 21 is very large, and the edge/center ratio, which is a measure of the homogeneity of the illumination, is correspondingly small.

In order to improve the homogeneity, it is possible, as indicated by the dashed lines in FIG. 2, to supply for example only a segment of the illumination, that is to say that the small values of the distribution can be cut off. This reduces the difference between the maximum 21 and a new edge-side minimum 23, but worsens the efficiency. The small illuminance values would remain unused. The dotted line illustrates a faceted reflector for comparison; the homogeneity is thereby improved, but the efficiency deteriorates.

In the case of the lighting device 1 according to various embodiments, therefore, initially, to stay in the illustration from FIG. 2, only a central part of the distribution is admittedly cut out by a corresponding positioning of the exit pupil 7 (see FIG. 1) relative to the ellipsoidal reflection surface 4. The exit pupil is therefore positioned in such a way that, in the case of a lighting device 1 theoretically consisting solely of light source 2, ellipsoidal reflection surface 4 and exit pupil 7, only a first part of the light reflected at the reflection surface 4 would pass through the exit pupil 7, but a second part would lie outside the latter, that is to say would be incident on an aperture stop 8.

However, the lighting device 1 according to various embodiments additionally includes an aspherical lens 9, which, then, on the one hand, allows the first part of the light to pass toward the exit pupil 7 without a change of direction, but deflects the second part (actually lying outside the exit pupil 7), to be precise through the exit pupil 7. For this purpose, the aspherical lens 9 is shaped as a plane-parallel plate in a central region through which the first part of the reflected light penetrates; by contrast, an outer region of the aspherical lens 9, through which outer region the second part of the reflected light penetrates, is shaped as converging lens in order to concentrate the second part of the reflected light into the exit pupil 7.

Figure 3:
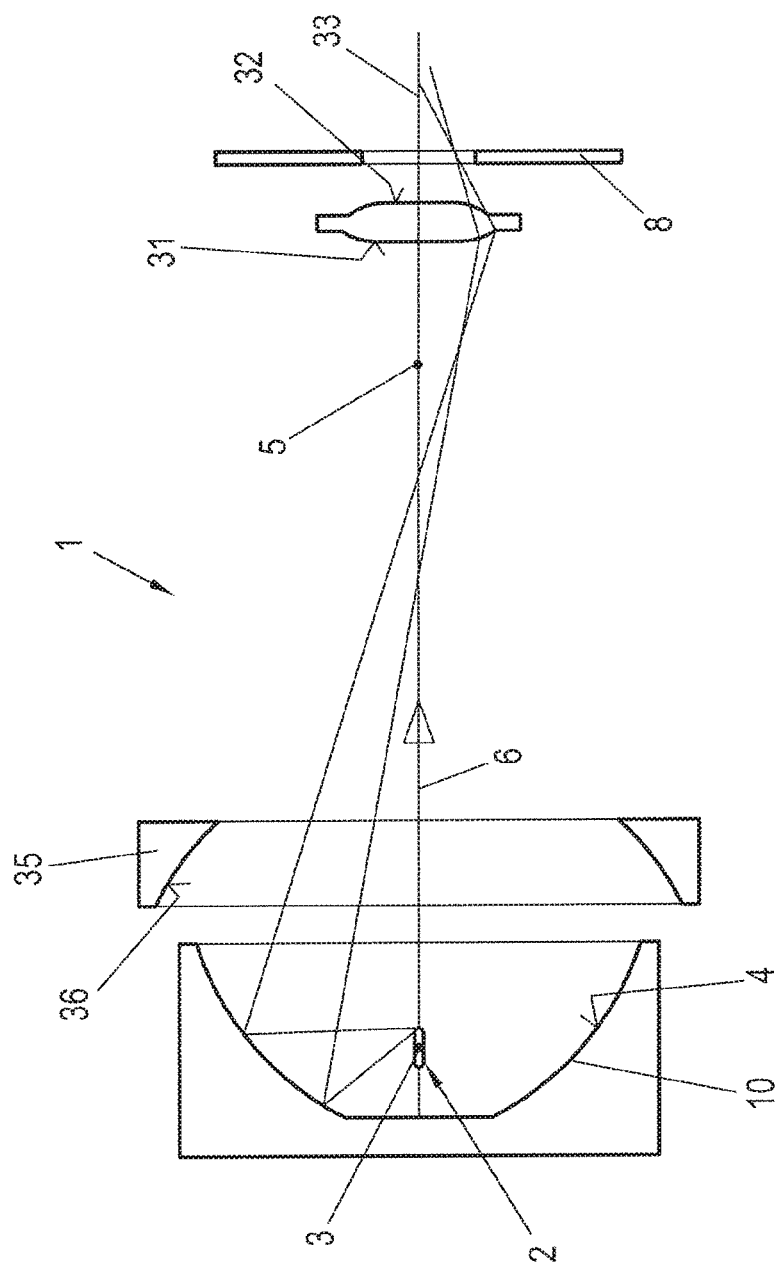
FIG. 3 shows the lighting device in accordance with FIG. 1 with a beam path illustrating the second part of the reflected light.

FIG. 3 shows the same construction as FIG. 1, although with a different beam of rays (which is likewise emitted in a manner offset with respect to the first focal point 3), which beam of rays illustrates namely the second part of the reflected light, which would therefore lie outside the exit pupil 7 without the aspherical lens 9. The aspherical lens 9, which is shaped as a converging lens in its outer region, concentrates the second part of the light, however, such that said second part is incident through the exit pupil (also see the basic schematic diagram in accordance with FIG. 4). An entrance surface 31 of the aspherical lens 9 is convex in an edge region through which the second part of the light penetrates, and the opposite exit surface 32 is likewise convex in an edge region through which the second part of the reflected light penetrates.

FIG. 1 and FIG. 3 furthermore reveal a further reflector 35 having a spherical reflection surface 36. The midpoint of the sphere underlying the spherical reflection surface 36 coincides with the light source 2 and the first focal point 3. Light emitted by the light source 2 toward the front, that is to say obliquely upward and downward to the right in the figures, is reflected back at the spherical reflection surface 36, penetrates through the light source 2 and is then incident on the ellipsoidal reflection surface 4. The further reflector 35 increases the efficiency, wherein the arrangement of the aspherical lens 9 between the second focal point 5 and exit pupil 7 may offer enough space for the arrangement of the further reflector 35.

Figure 4:
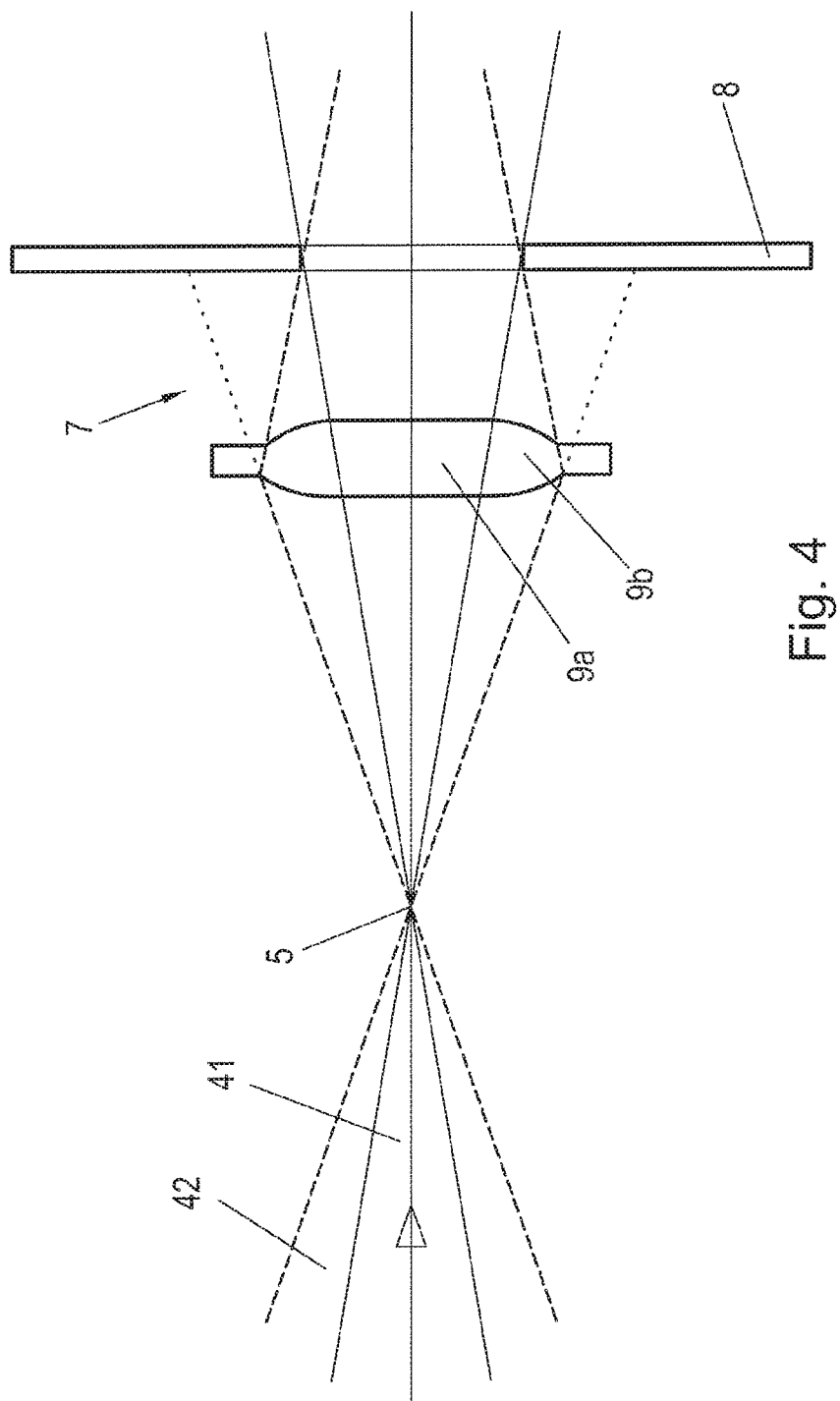
FIG. 4 shows a basic schematic diagram for illustrating the effect of the aspherical lens.

FIG. 4 illustrates the unimpeded passing of the first part and the concentration of the second part by means of the aspherical lens once again with a basic schematic diagram. The first part 41 of the light reflected from the ellipsoidal reflection surface 4 (not shown in FIG. 4 for the sake of clarity) passes through the exit pupil 7 anyway and is therefore not angularly tilted (no change in direction) by the central region 9a of the aspherical lens 9; the central region 9a is shaped as a plane-parallel plate. The second part 42 of the light reflected at the ellipsoidal reflection surface 4 would lie outside the exit pupil 7, however, which is illustrated in the present case by the beam path depicted in a dotted manner. The aspherical lens, which is shaped as a converging lens in the outer region 9b, refracts said second part 42 into the exit pupil 7, however. The second part 42 of the reflected light is therefore concentrated and thus guided jointly with the first part 41 of the reflected light through the exit pupil 7.

In the present case, the aspherical lens 9 is arranged downstream of the second focal point 5. At least in principle it would alternatively also be conceivable to provide an aspherical lens upstream of the second focal point 5, said aspherical lens being shaped likewise as a plane-parallel plate in the central region, through which the first part 41 of the reflected light penetrates, but as a diverging lens in the outer region through which the second part 42 penetrates. The aperture angle of the second part 42 of the reflected light would be increased upstream of the second focal point 5 and correspondingly decreased downstream thereof, such that the second part 42 of the light would in turn be refracted into the exit pupil 7, that is to say guided through the latter.

Figure 5:
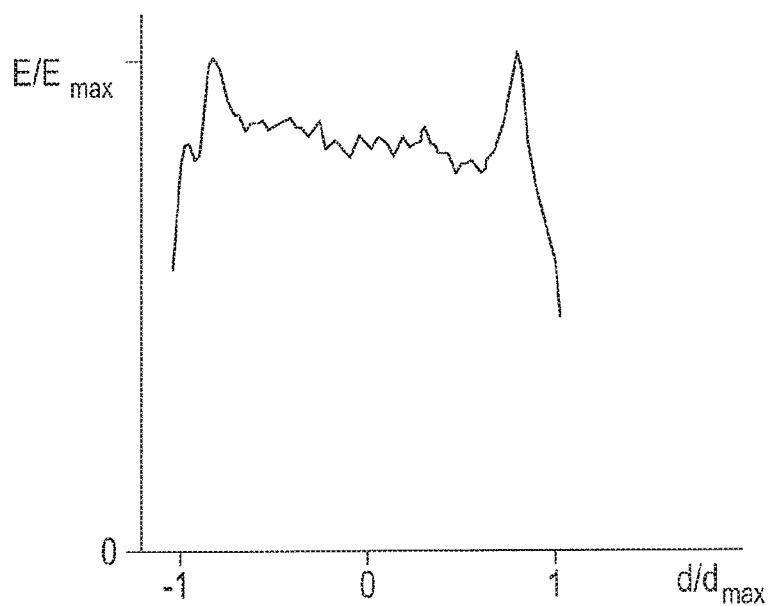
FIG. 5 shows the illuminance profile in the exit pupil of the lighting device in accordance with FIG. 1 and FIG. 3.

FIG. 5 shows, for the lighting device 1 in accordance with FIG. 1 and FIG. 3, the illuminance profile in the plane of the exit pupil, specifically taken along a straight line which runs through a point of intersection between said plane and an optical axis 33 of the aspherical lens 9 (cf. FIG. 3 for the illustration). The illuminance taken along said straight line is in turn plotted in a diagram, and a uniform profile is manifested. The edge/center ratio is approximately 1. The homogeneity is even better than in a comparison case in which solely the first part 41 of the reflected light is utilized; moreover, the efficiency is increased in relation to said comparison case because the second part 42 of the reflected light is indeed additionally utilized.

FIG. 6 shows in tabular form the values of the aspherical lens shown in FIG. 1 and FIG. 3. The parameters relate to the asphere equation $$z = \frac{cr^2}{1+\sqrt{1-(1+k)c^2r^2}} + \beta_1 r^1 + \beta_2 r^2 + \beta_3 r^3 + \beta_4 r^4 + \beta_5 r^5 + \ldots \quad \text{(Equ. 1)}$$

In this case, r indicates the distance perpendicular to the optical axis outward (height of incidence), z indicates the sagittal height (surface of revolution of the aspherical lens), k is the conic constant and c is the vertex curvature. The unit of c and $\beta_2$ is in each case 1/mm, that of $\beta_3$ is 1/mm$^2$ and that of $\beta_4$ is 1/mm$^3$; the coefficients starting from $\beta_5$ are equal to zero.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A lighting device, comprising:
a light source for emitting light;
a reflector having an ellipsoidal reflection surface;
an aspherical lens, wherein the aspherical lens comprises a central region and an outer region wherein the outer region is shaped as a converging lens; and
an exit pupil as output of the lighting device;
wherein the light source is arranged at a first focal point of the ellipsoidal reflection surface and at least one part of the light emitted by the light source is reflected from the ellipsoidal reflection surface in the direction of a second focal point;
wherein the exit pupil is arranged in a manner offset with respect to the second focal point along an optical axis extending from the ellipsoidal reflection surface to the exit pupil;
wherein further the aspherical lens is arranged between the second focal point and the exit pupil in a beam path with the reflected light and is shaped in such a way that
a first part of the reflected light passes through the aspherical lens with an aperture angle altered by not more than 5° in the central region and passes through the exit pupil and additionally
a second part of the reflected light penetrates through the aspherical lens in the outer region and is deflected by the aspherical lens and is consequently guided through the exit pupil; and
wherein an exit surface of the aspherical lens is convex in an edge region through which the second part of the light penetrates.

2. The lighting device of claim 1,
wherein the emitted light is emitted in straight lines, wherein the straight lines are comprised of at least a first set and a second set; and
wherein the exit pupil is dimensioned and arranged relatively to the reflector such that of all of the straight lines are configured in each case to be reflected at the ellipsoidal reflection surface and penetrate through the second focal point, only the first set falls through the exit pupil, but the second set lies outside the exit pupil.

3. The lighting device of claim 2,
wherein the reflected light generates, on an entrance surface of the aspherical lens, an illuminance profile having a maximum in the center region extending over the entrance surface of the aspherical lens, wherein an illuminance value is less than the value of the maximum by at least 20% and at most 80%;
wherein the first set of straight lines penetrates through the center region and the second set of straight lines penetrates through an edge region of the entrance surface lying outside the center region.

4. The lighting device of claim 1,
wherein the aspherical lens is shaped and arranged in such a way that the first part of the reflected light penetrates through the aspherical lens substantially without a change of direction.

5. The lighting device of claim 4,
wherein the aspherical lens is shaped as a plane-parallel plate in the central region.

6. The lighting device of claim 1,
wherein the first part of the reflected light penetrates through the aspherical lens and the aspherical lens has a substantially constant thickness in the central region.

7. The lighting device of claim 1,
wherein an entrance surface of the aspherical lens is convex in an edge region through which the second part of the light penetrates.

8. The lighting device of claim 1,
wherein the aspherical lens is arranged nearer to the exit pupil than to the second focal point.

9. The lighting device of claim 1,
wherein the exit pupil has an exit pupil diameter and an edge region of an entrance surface of the aspherical lens, through which edge region the second part of the light penetrates, has an external diameter—taken perpendicular to an optical axis of the aspherical lens—which is greater than the exit pupil diameter.

10. The lighting device of claim 9,
wherein a center region of an entrance surface of the aspherical lens, through which center region the first part of the light penetrates, has an external diameter—taken perpendicular to the optical axis of the aspherical lens—which makes up at least ⅔ of the exit pupil diameter.

11. The lighting device of claim 1, further comprising:
a further reflector, which has a spherical reflection surface, wherein the light source is arranged at a midpoint of the spherical reflection surface_and a part of the light emitted by the light source is incident on the spherical reflection surface without reflections and is reflected therefrom back in the direction of the light source, passes through the midpoint and is incident on the ellipsoidal reflection surface.

12. The lighting device of claim 11,
wherein the spherical reflection surface is provided completely circumferentially relative to an optical axis of the ellipsoidal reflection surface, but is interrupted in a region which is intersected by the optical axis and through which passes the light reflected at the ellipsoidal reflection surface.

13. The lighting device of claim 1,
configured as a spot light.

14. A lighting device, comprising:
a light source for emitting light;
a reflector having an ellipsoidal reflection surface;
an aspherical lens, wherein the aspherical lens comprises a central region and an outer region wherein the outer region is shaped as a converging lens; and
an exit pupil as output of the lighting device;
wherein the light source is arranged at a first focal point of the ellipsoidal reflection surface and at least one part of the light emitted by the light source is reflected from the ellipsoidal reflection surface in the direction of a second focal point;
wherein the exit pupil is arranged in a manner offset with respect to the second focal point along an optical axis extending from the ellipsoidal reflection surface to the exit pupil;
wherein further the aspherical lens is arranged between the second focal point and the exit pupil in a beam path with the reflected light and is shaped in such a way that
a first part of the reflected light passes through the aspherical lens with an aperture angle altered by not more than 5° in the central region and passes through the exit pupil and additionally
a second part of the reflected light penetrates through the aspherical lens in the outer region and is deflected by the aspherical lens and is consequently guided through the exit pupil; and
wherein the aspherical lens is arranged nearer to the exit pupil than to the second focal point.

\* \* \* \* \*